United States Patent [19]

Oda et al.

[11] Patent Number: 4,714,063

[45] Date of Patent: Dec. 22, 1987

[54] INTAKE SYSTEM FOR INTERNAL COMBUSTION ENGINE

[75] Inventors: Hiroyuki Oda; Akihito Nagao; Masanori Misumi; Akinori Yamashita; Katsumi Okazaki, all of Hiroshima, Japan

[73] Assignee: Mazda Motor Corporation, Japan

[21] Appl. No.: 907,996

[22] Filed: Sep. 16, 1986

[30] Foreign Application Priority Data

| Sep. 17, 1985 | [JP] | Japan | 60-205786 |
| Sep. 17, 1985 | [JP] | Japan | 60-205787 |
| Sep. 17, 1985 | [JP] | Japan | 60-205788 |
| Sep. 17, 1985 | [JP] | Japan | 60-205789 |

[51] Int. Cl.$^4$ .................................... F02B 31/00
[52] U.S. Cl. .................................. 123/308; 123/432; 123/190 A
[58] Field of Search ............... 123/190 A, 337, 432, 123/308

[56] References Cited

FOREIGN PATENT DOCUMENTS 58-23245 2/1983 Japan .
58-152122 9/1983 Japan .
58-214637 12/1983 Japan .

Primary Examiner—E. Rollins Cross
Attorney, Agent, or Firm—Gerald J. Ferguson, Jr.; Michael P. Hoffman; Michael J. Foycik, Jr.

[57] ABSTRACT

An intake system for an internal combustion engine comprises a first valve provided to open and close an intake passage leading to each combustion chamber, a bypass passage for introducing intake air into each combustion chamber bypassing the first valve, and a second valve provided to open and close each of the bypass passages. The first valves are operated to close the respective intake passages in a light load range and to open the same in a heavy load range. The second valve is operated to close the bypass passage in the middle of each intake stroke. The first valves are controlled so that the opening of the intake passages is increased as the engine load increases after exceeding a predetermined value, and the second valve is controlled to delay the time the bypass passage is closed with increase in the engine load so that the time the bypass passage is opened overlaps with the time the intake valve is opened when the engine load reaches the predetermined value.

14 Claims, 11 Drawing Figures

INTAKE SYSTEM FOR INTERNAL COMBUSTION ENGINE

BACKGROUND OF THE INVENTION

1. Field of the Invention

This invention relates to an intake system for an internal combustion engine, and more particularly to an intake system having a main intake passage which leads to each combustion chamber and is provided with a shutter valve to be opened when the amount of depression of the accelerator pedal exceeds a predetermined value and a bypass passage which is provided to bypass the shutter valve, is smaller than the main intake passage in cross section and is provided with a timing valve for closing the bypass passage at a predetermined time in each cycle.

2. Description of the Prior Art

In the intake system disclosed in Japanese unexamined Patent Publication No. 58(1983)-23245, an intake passage is provided with a shutter valve which is opened when the amount of depression of the accelerator pedal becomes not smaller than a predetermined value, and a bypass passage is provided to bypass the shutter valve. The bypass passage is smaller than the intake passage in cross section and is provided with a rotary valve which is rotated at half the rotational speed of the camshaft. When the amount of depression of the accelerator pedal is smaller than the predetermined value, that is, in the light load range, the shutter valve is closed so that intake air is introduced into the combustion chamber solely through the bypass passage, thereby increasing the flow speed of intake air to generate swirl of air-fuel mixture in the combustion chamber so as to improve combustion in the combustion chamber. The bypass passage is closed by the rotary valve in the middle of the intake stroke to reduce pumping loss, thereby improving fuel economy. When the amount of depression of the accelerator pedal is not smaller than the predetermined value, that is, in the heavy load range, the shutter valve is opened to open the intake passage and intake air is introduced into the combustion chamber through both the intake passage and the bypass passage, thereby increasing output power.

However, such an intake system gives rise to the following problem. In the light load range, reduction of pumping loss is obtained by a so-called Miller cycle generated by closing the rotary valve in the middle of the intake stroke. When the amount of depression of the accelerator pedal is increased to the predetermined value and the shutter valve is opened, intake air comes to be introduced also through the intake passage and the actual end of intake is abruptly changed from the middle of the intake stroke to the end of the intake stroke. That is, operation of the engine is abruptly changed from the Miller cycle to the normal or Otto cycle, causing torque shock, and accordingly the engine output power cannot be smoothly increased.

SUMMARY OF THE INVENTION

In view of the foregoing observations and description, the primary object of the present invention is to provide an intake system for an internal combustion engine of the type described above in which torque shock upon opening of the shutter valve can be prevented.

In accordance with the present invention, there is provided an intake system for an internal combustion engine comprising a first valve means provided to open and close an intake passage leading to each combustion chamber, a bypass passage for introducing intake air into each combustion chamber bypassing the first valve means, and a second valve means provided to open and close the bypass passage, the first valve means being operated to close the intake passage in a light load range and to open the same in a heavy load range, and the second valve means being operated to close the bypass passage in the middle of each intake stroke, wherein the improvement comprises a first valve control means which controls the first valve means so that the opening of the intake passage is increased as the engine load increases after exceeding a predetermined value, and a second valve control means which controls the second valve means to delay the time the bypass passage is closed with increase in the engine load so that the time the bypass passage is opened overlaps with the time the intake valve is opened when the engine load reaches the predetermined value.

In the intake system of the present invention, when the engine load is lighter than the predetermined value, the flow speed of intake air is increased since the intake passage is closed and intake air is introduced solely through the bypass passage and accordingly swirl of intake air is generated in the combustion chamber, thereby improving combustion in the combustion chamber, and at the same time, since the bypass passage is closed in the middle of each intake stroke and operation of the engine is changed to the Miller cycle, the pumping loss is effectively reduced and fuel economy is improved.

Since the time the bypass passage is closed is gradually delayed with increase in the engine load in the light load range so that the time the bypass passage is opened overlaps with the time the intake valve is opened when the engine load reaches the predetermined value and the intake passage is opened when the actual end of intake comes to coincide with the end of each intake stroke, shift from the Miller cycle to the Otto cycle can be smoothly effected, whereby the engine output power can be smoothly increased without torque shock.

DESCRIPTION OF THE PREFERRED EMBODIMENTS

Figure 1:
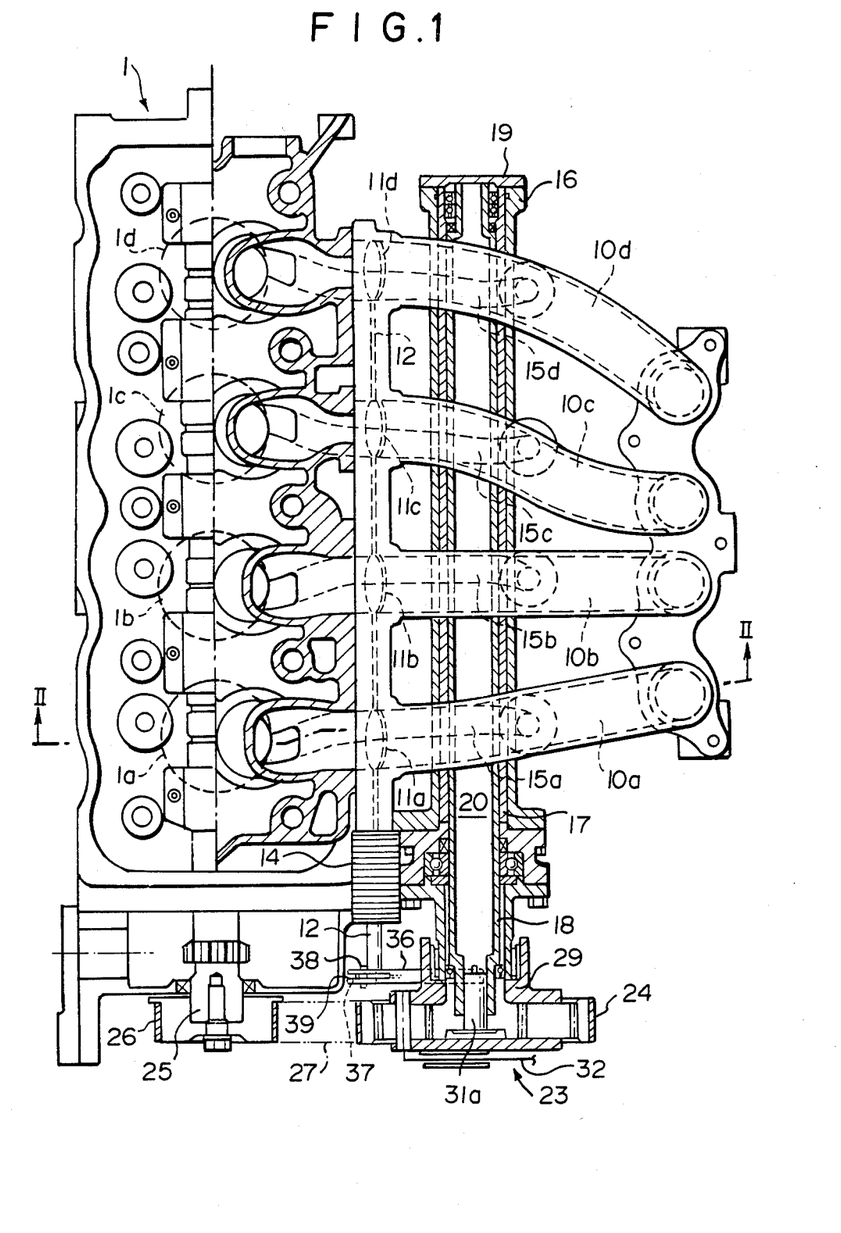
FIG. 1 is a cross-sectional view showing an internal combustion engine provided with an intake system in accordance with an embodiment of the present invention.
Figure 2:
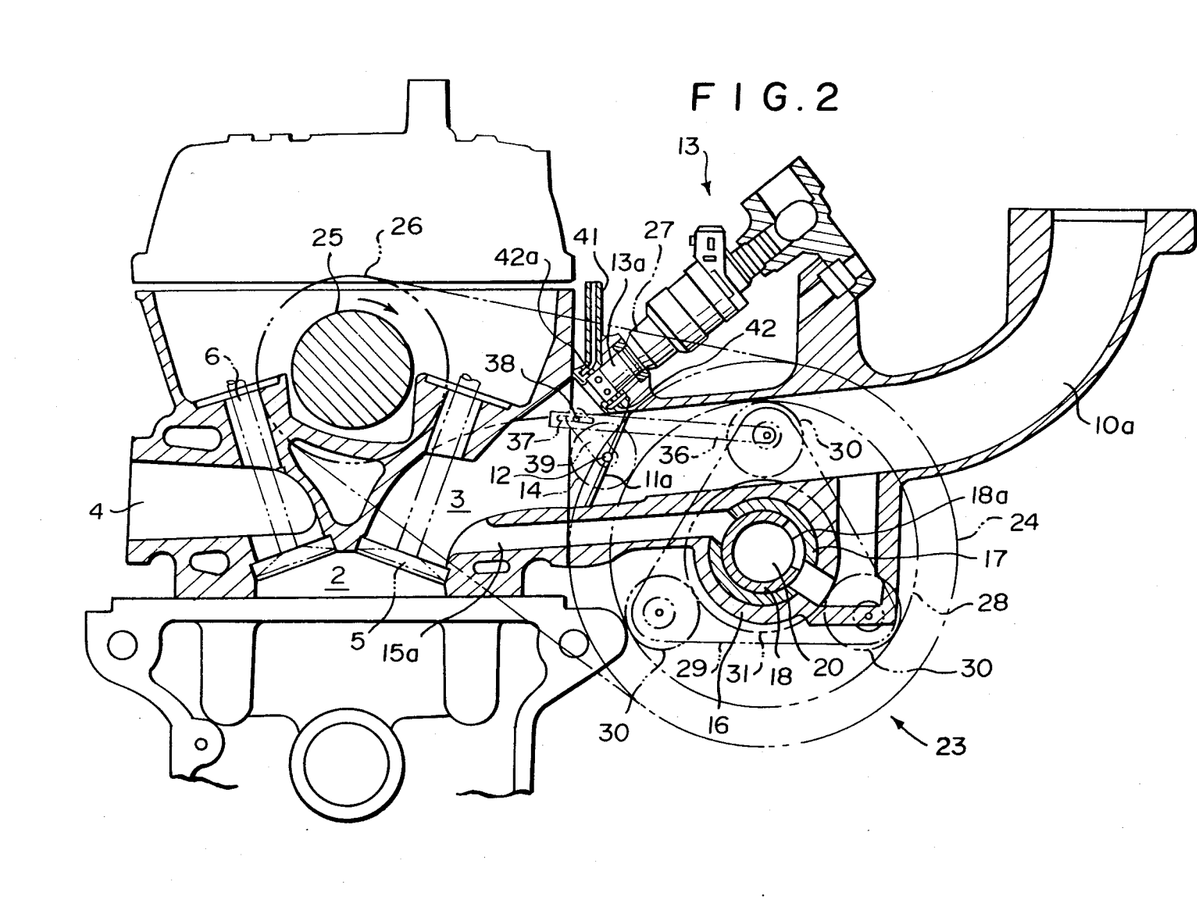
FIG. 2 is a cross-sectional view taken along line II—II in FIG. 1.

In FIGS. 1 and 2, a four-cylinder four-cycle engine 1 has first to fourth cylinders 1a to 1d in each of which combustion chamber 2 is defined. To each combustion chamber 2 open an intake port 3 and an exhaust port 4 which are respectively provided with an intake valve 5 and an exhaust valve 6.

Intake air is introduced into the combustion chambers 2 defined in the first to fourth cylinders 1a to 1d respectively by way of intake passages 10a to 10d. The intake passages 10a to 10d are provided at a portion near the intake port 3 with shutter valves 11a to 11d respectively for opening and closing the intake passages 10a to 10d. The shutter valves 11a to 11d are connected to a valve shaft 12 extending in the direction of the cylinder row, and are adapted to be driven integrally with each other. Further, the shutter valves 11a to 11d are urged toward a closed position in which they close the corresponding intake passages 10a to 10d. Fuel injection valves 13 are disposed in the intake passages 10a to 10d immediately downstream of the shutter valves 11a to 11d.

Bypass passages 15a to 15d communicate portions of the intake passages 10a to 10d upstream of the shutter valves 11a to 11d with the intake ports 3 bypassing the shutter valves 11a to 11d. The bypass passages 15a to 15d are smaller than the intake passages 10a to 10d in crosssection and the downstream end of each bypass passage is directed in the peripheral direction of the combustion chamber 2 so that intake air introduced into the combustion chamber 2 through the bypass passage swirls in the combustion chamber 2.

A rotary valve 18 is inserted into the bypass passages 15a to 15d at an intermediate portion thereof. The rotary valve 18 is a hollow tubular member having a passage 20 and supported for rotation in a cylindrical member 16 by way of a sleeve 17. The first cylinder side end of the rotary valve 18 is closed by a rotating shaft 31a of a sun gear 31 of a planetary gear mechanism 23 (to be described later) which is snugly fit into the end. The other end of the rotary valve 18 is closed by closure member 19. Openings 18a are formed in the rotary valve 18 at portions corresponding to the bypass passages 15a to 15d. Each opening 18a extends in a peripheral direction of the rotary valve 18 over an angle corresponding to the time for which the corresponding intake valve 5 is opened at an angular position corresponding to the intake stroke of the corresponding cylinder. When the opening 18a corresponding to the bypass passage leading to one cylinder in the intake stroke is aligned with the downstream portion of the bypass passage, the opening 18a corresponding to the bypass passage leading to the cylinder in which the intake stroke occurs two strokes after said one cylinder is aligned with the upstream portion thereof, and accordingly intake air can be introduced into the combustion chamber 2 by way of the upstream portion of the latter bypass passage, the passage 20 in the rotary valve 18 and the downstream portion of the former bypass passage.

Figure 3:
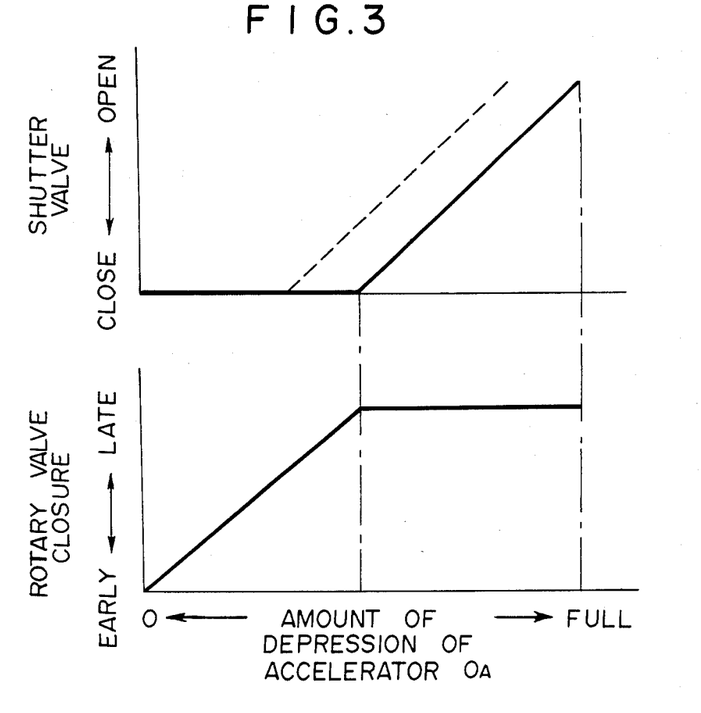
FIG. 3 is a view for illustrating control to be made on the shutter valves and the rotary valve in the present invention.

A larger diameter pulley 24 is connected to the first cylinder side end of the rotary valve 18 by way of the planetary gear mechanism 23. The larger diameter pulley 24 is drivingly connected with a smaller diameter pulley 26 provided on a camshaft 25 by way of a belt 27 to drive the rotary valve 18 in response to revolution of the camshaft 25. The planetary gear mechanism 23 comprises a ring gear 28 coaxially connected to the larger diameter pulley 24, three planet pinions 30 which are mutually connected by a carrier 29 and are in mesh with the ring gear 28, and the sun gear 31 in mesh with the planet pinions 30. The planetary gear mechanism 23 is arranged to rotate the rotary valve 18 once per revolution of the camshaft 25. Each of the openings 18a of the rotary valve 18 is positioned to close the corresponding bypass passage at a predetermined time in the middle of the intake stroke of the corresponding cylinder when the accelerator pedal (not shown) is released and the planet pinions 30 are in the initial position shown in FIG. 2. The carrier 29 is connected to the accelerator pedal by a wire member 32 to be rotated in the clockwise direction as seen in FIG. 2 as the accelerator pedal is pushed down. That is, as the amount of depression of the accelerator pedal is increased, the relative position between the ring gear 28 and the sun gear 31 is changed to displace the openings 18a of the rotary valve 18 in the clockwise direction, whereby the time each bypass passage is closed is delayed with increase in the amount of depression of the accelerator pedal as shown in FIG. 3 so that closure of the bypass passage occurs simultaneously with the end of each intake stroke when the amount of depression of the accelerator pedal reaches a predetermined value $O_A$, i.e., so that the time that the bypass passage opens substantially overlaps with the time the intake valve 5 opens.

One of the planet pinions 30 (the one positioned above the others in FIG. 2 in this particular embodiment) is operatively connected to an end of the valve shaft 12 of the shutter valves 11a to 11d by way of a first link 36 extending from the planet pinion 30 toward the valve shaft 12 and a second link 39 having an engaging pin 38 inserted into an elongated slot 37 formed in the first link 36 to extend in the longitudinal direction thereof. The length of the slot 37 is selected so that the engaging pin 38 travels from one end of the slot 37 to the other end of the same while the accelerator pedal is pushed down from the released position to the position corresponding to the predetermined value OA and the planet pinion 30 is displaced in the clockwise direction. That is, while the accelerator pedal is pushed down from the released position to the position corresponding to the predetermined value $O_A$, the second link 39 is held in the position shown in FIG. 2 in which the shutter valves 11a to 11d are closed since the engaging pin 38 moves in the slot 37 and the motion of the first link 36 is not transmitted to the second link though the planet pinions 30 are clockwisely displaced to delay the time for closure of the bypass passages 15a to 15d and the first link 36 is moved rightward in FIG. 2. When the accelerator pedal is pushed down beyond the position corresponding to the predetermined value $O_A$, the motion of the first link 36 is transmitted to the second link 39 by way of the engagement between the engaging pin 38 and the end of the slot 37 and the valve shaft 12 is clockwisely rotated to open the shutter valves 11a to 11d according to the amount of depression of the accelerator pedal. The relations of the amount of depression of the accelerator pedal with the position of the shutter valves and with the time for closure of the rotary valve 18 are shown in FIG. 3.

An assist air passage 41 is provided to be communicated with an air cleaner (not shown) at one end and with a portion of the intake passage near the injecting tip 13a of the fuel injection valve 13 at the other end by way of a plurality of orifices 42a formed in a cap 42 mounted on the end of the fuel injection valve. In the light load range in which intake air is introduced into the combustion chamber 2 solely through the bypass passages 15a to 15d and substantially no air flows around the fuel injection valve 13, assist air is provided to atomize fuel injected from the valve 13 to improve combustion of the fuel in the combustion chamber 2.

In this embodiment, in the light load range in which the shutter valves 11a to 11d close the intake passages 10a to 10d, intake air is introduced into the combustion chamber 2 solely through the bypass passages 15a to 15d and accordingly the flow speed of intake air is increased and swirl is generated, thereby improving combustion in the combustion chamber 2. Further, since the rotary valves 18 close the bypass passages 15a to 15d to terminate intake in the middle of each intake stroke, pumping loss is reduced and fuel economy is improved. In this conjunction, though the effective compression ratio is lowered because of termination of intake in the middle of the intake stroke and the combustion temperature of air-fuel mixture is lowered, good combustion is ensured by swirl of intake air.

As the amount of depression of the accelerator pedal is increased, the time for closure of the rotary valve 18 or closure of the bypass passages 15a to 15d is delayed and the amount of intake air is gradually increased, and after the amount of depression of the accelerator pedal exceeds the predetermined value $O_A$ at which the time the bypass passages 15a to 15d are closed is coincide with the end of each intake stroke, the shutter valves 11a to 11d begin to be opened with the opening degree being increased with increase in the amount of depression of the accelerator pedal, whereby the amount of intake air is gradually increased to increase the engine output power.

Since the shutter valves 11a to 11d begin to be opened when the time the rotary valve 18 is closed coincides with the end of each intake stroke, shift from the Miller cycle to the Otto cycle is smoothly effected to prevent torque shock, thereby ensuring smooth increase in the engine output power.

Further, since the rotary valve 18 is rotated once per revolution of the camshaft 25 in this particular embodiment, the effective cross-sectional area of the bypass passages 15a to 15d when the rotary valve 18 is opened is larger than that in the conventional system in which the rotary valve makes a half revolution per revolution of the camshaft, whereby a larger amount of intake air can be introduced into the combustion chambers. Further, since the rotary valve 18 is rotated once per revolution of the camshaft 25, when, for example, the opening 18a of the rotary valve 18 corresponding to the bypass passage 15a leading to the first cylinder 1a is brought into alignment with the downstream portion of the bypass passage 15a, the opening 18a of the rotary valve corresponding to the bypass passage 15d leading to the fourth cylinder 1d (in which the intake stroke occurs two strokes after the first cylinder 1a, or with a phase difference of 180° with respect to the first cylinder 1a) is brought into alignment with the upstream portion of the latter bypass passage 15d to permit introduction of intake into the first cylinder 1a through the downstream portion of the bypass passage 15a leading to the first cylinder 1a, the passage 20 in the rotary valve 18 and the upstream portion of the bypass passage 15d leading to the fourth cylinder 1d as described above. This arrangement is advantageous in view of simplification of the structure.

Figure 4:
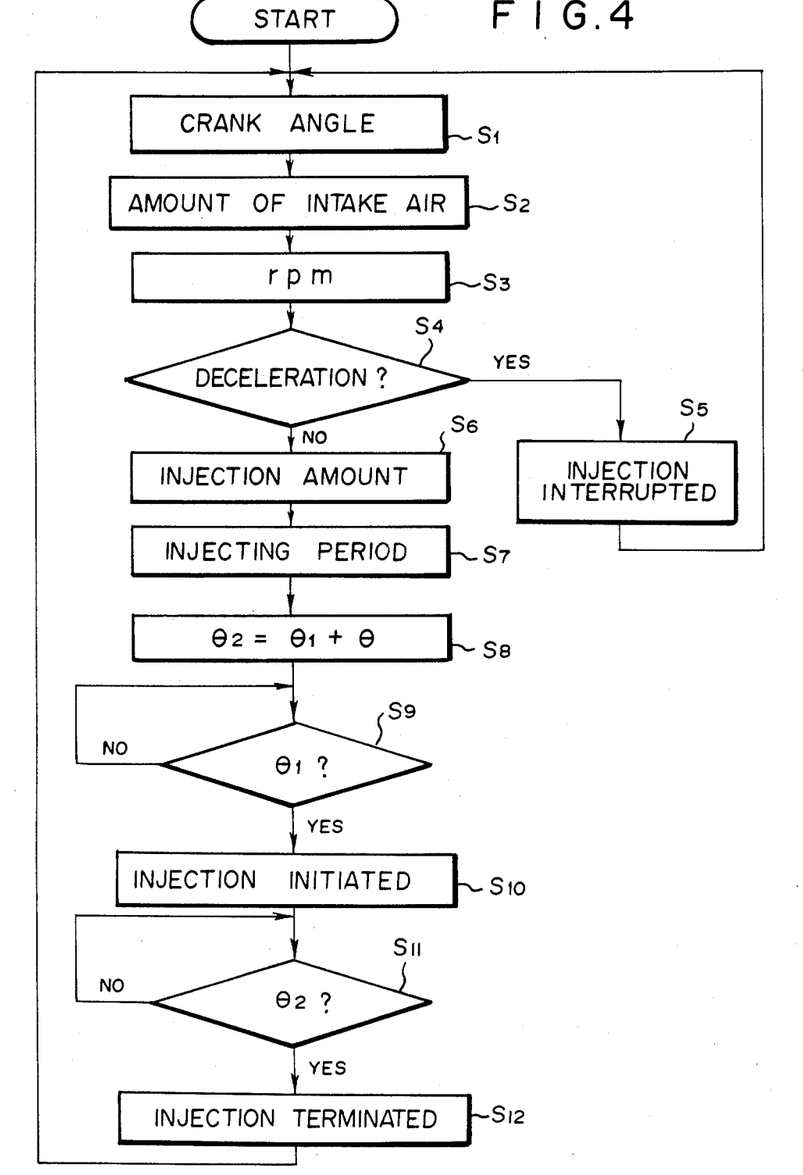
FIG. 4 is a flow chart for illustrating an example of a control to be made on the fuel injection valves in the engine shown in FIGS. 1 and 2.

Now an example of control to be made on the fuel injection valves 13 will be described with reference to the flow chart shown in FIG. 4. In step S1, the crank angle is read and in step S2, the amount of intake air is read on the basis of the air flow immediately downstream of the air cleaner. The engine speed is calculated in step S3, and in step S4, it is determined whether the engine operating condition is in a deceleration zone. When it is determined that the engine operating condition is in a deceleration zone in the step S4, fuel injection from the fuel injection valve 13 is stopped in step S5 and then the step S1 is repeated.

Figure 5:
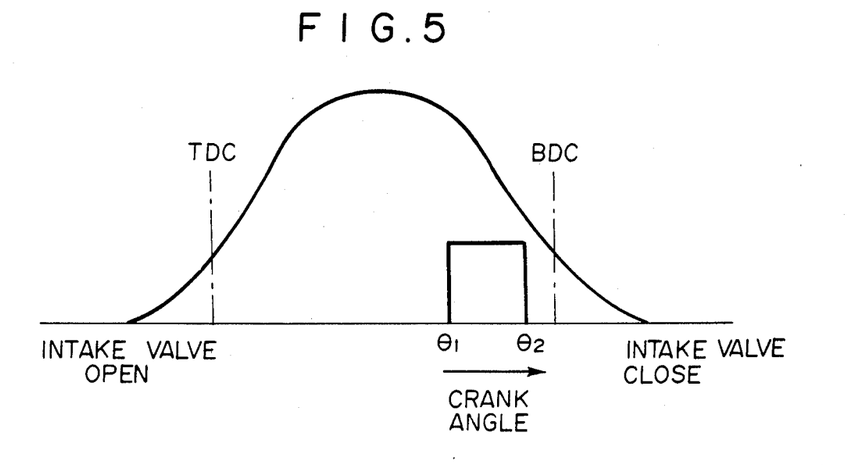
FIG. 5 is view for illustrating the fuel injection timing.

When it is not determined that the engine operating condition is in a deceleration zone in the step S4, the amount of fuel to be injected from the fuel injection valve 13 is determined in step S6 on the basis of the amount of intake air and the engine speed and then the fuel injecting period $\theta$ is determined in step S7 on the basis of the amount of fuel to be injected determined in the step S6. In step S8, the fuel injection period $\theta$ is added to a predetermined time $\theta 1$ (FIG. 5) at which fuel injection is to be initiated and which is in the latter half of the intake stroke, thereby obtaining the time $\theta 2$ at which fuel injection is to be terminated.

Then, after a wait (step S9), fuel injection is initiated in step S10 and fuel injection is continued until the time $\eta 2$ (step S11). The fuel injection is terminated at the time $\eta 2$ in step S12. Thereafter, the step S1 is repeated.

Generally it is preferred that the intake passages 10a to 10d are completely closed in the light load range in order to effectively reduce pumping loss. However, when air flow does not exist in the intake passage, introduction of fuel into the combustion chamber becomes difficult and at the same time, a part of fuel introduced into the combustion chamber is apt to be blown back toward the fuel injection valve 13 in the intake stroke after closure of the rotary valve 18, thereby fluctuating the air-fuel ratio in the light load operation of the engine to deteriorate combustion in the combustion chamber. However, in the intake system of this embodiment, fuel injected from the fuel injection valve 13 is atomized and smoothly introduced into the combustion chamber by virtue of the assist air, and further, blow-back of fuel can be prevented by the assist air. Thus, the air-fuel ratio can be precisely controlled in the light load range and good combustion in the combustion chamber is obtained irrespective of the fact that the injection of fuel is effected in the latter half of the intake stroke and air-fuel mixture is very lean.

Figure 6:
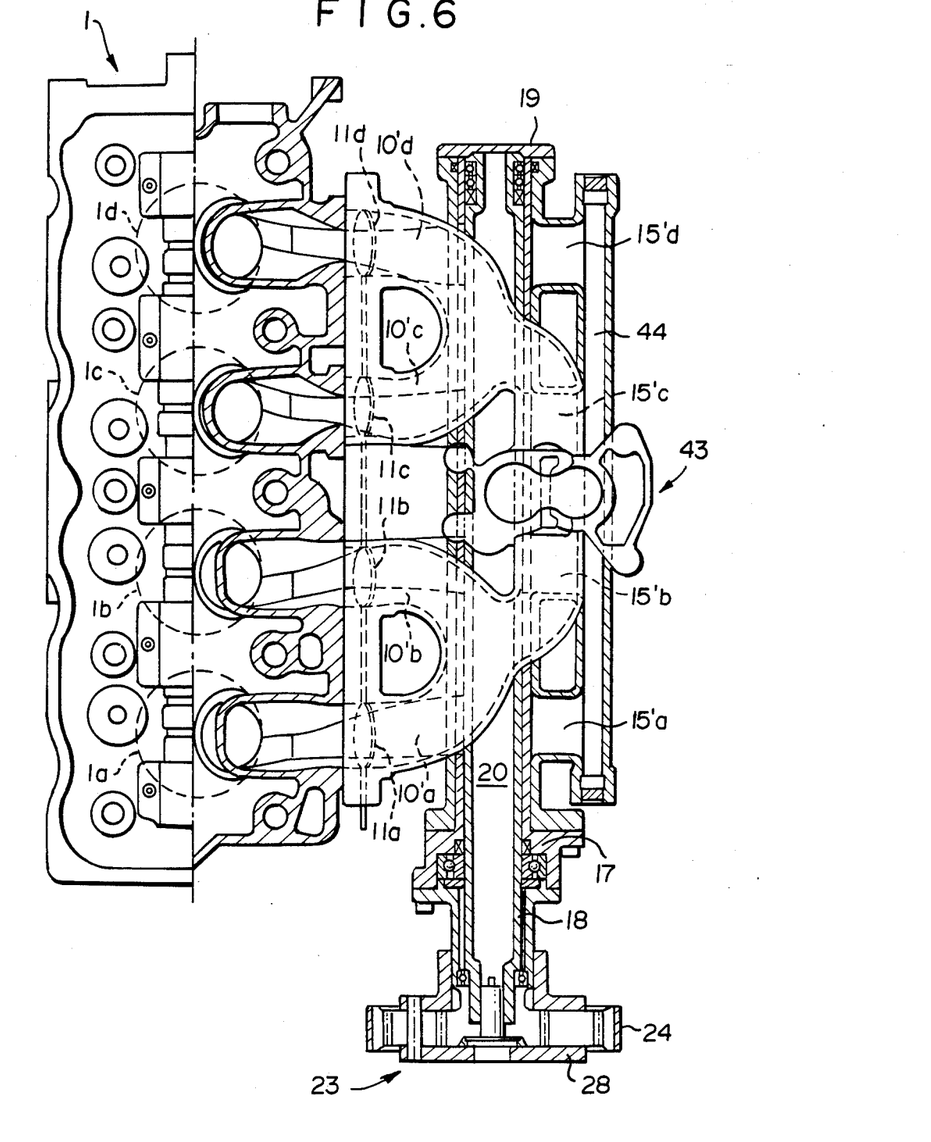
FIGS. 6 and 7 are views respectively similar to FIGS. 1 and 2 but showing an engine provided with an intake system in accordance with another embodiment of the present invention.
Figure 7:
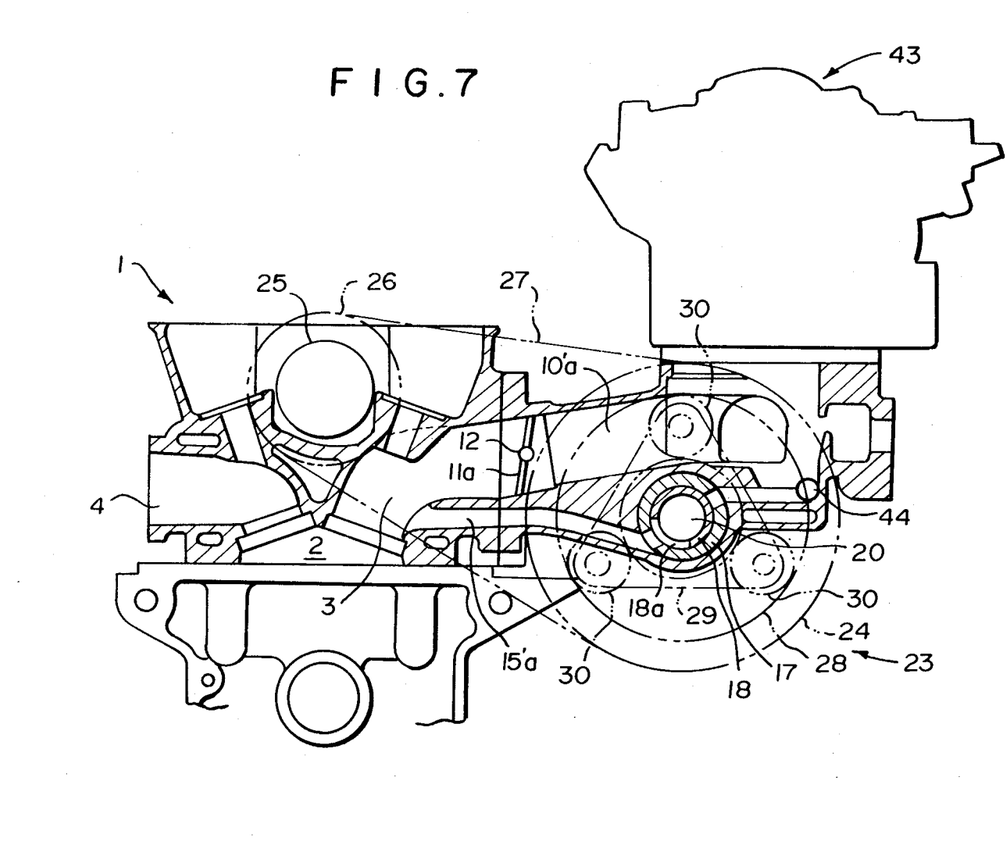

Though in the embodiment described above, the present invention is applied to an engine having fuel injection valves, the present invention can be applied also to an engine having a carburetor as shown in FIGS. 6 and 7. The engine shown in FIGS. 6 and 7 is very similar to that shown in FIGS. 1 and 2 except that it is provided with a carburetor instead of the fuel injections valves 13, and accordingly, in FIGS. 6 and 7, the parts analogous to those shown in FIGS. 1 and 2 are given the same reference numerals and will not be described in detail here. That is, the intake passages 10'a to 10'd are merged into a common intake passage and a carburetor 43 is provided in the common intake passage. In a portion downstream of the carburetor 43 is disposed a main bypass passage 44 which extends in the direction of the cylinder row and is communicated with the bypass passages 15'a to 15'd so that air-fuel mixture from the carburetor 43 can be fed to the bypass passages 15'a to 15'd through the main passage 44. Substantially the same effect can be enjoyed in this embodiment.

Figure 8:
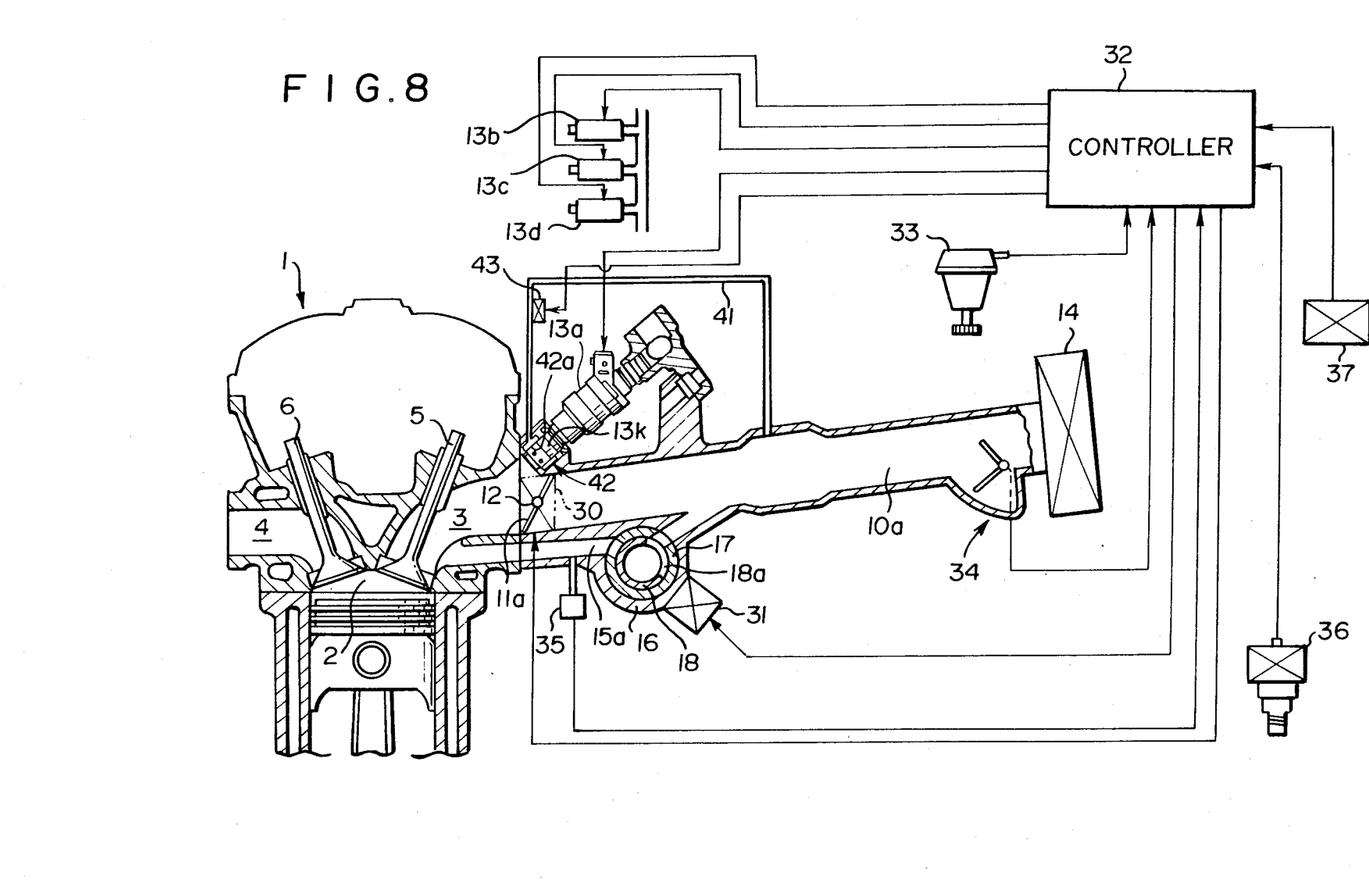
FIGS. 8 and 9 are views respectively similar to FIGS. 2 and 1 but showing an engine provided with an intake system in accordance with still another embodiment of the present invention.
Figure 9:
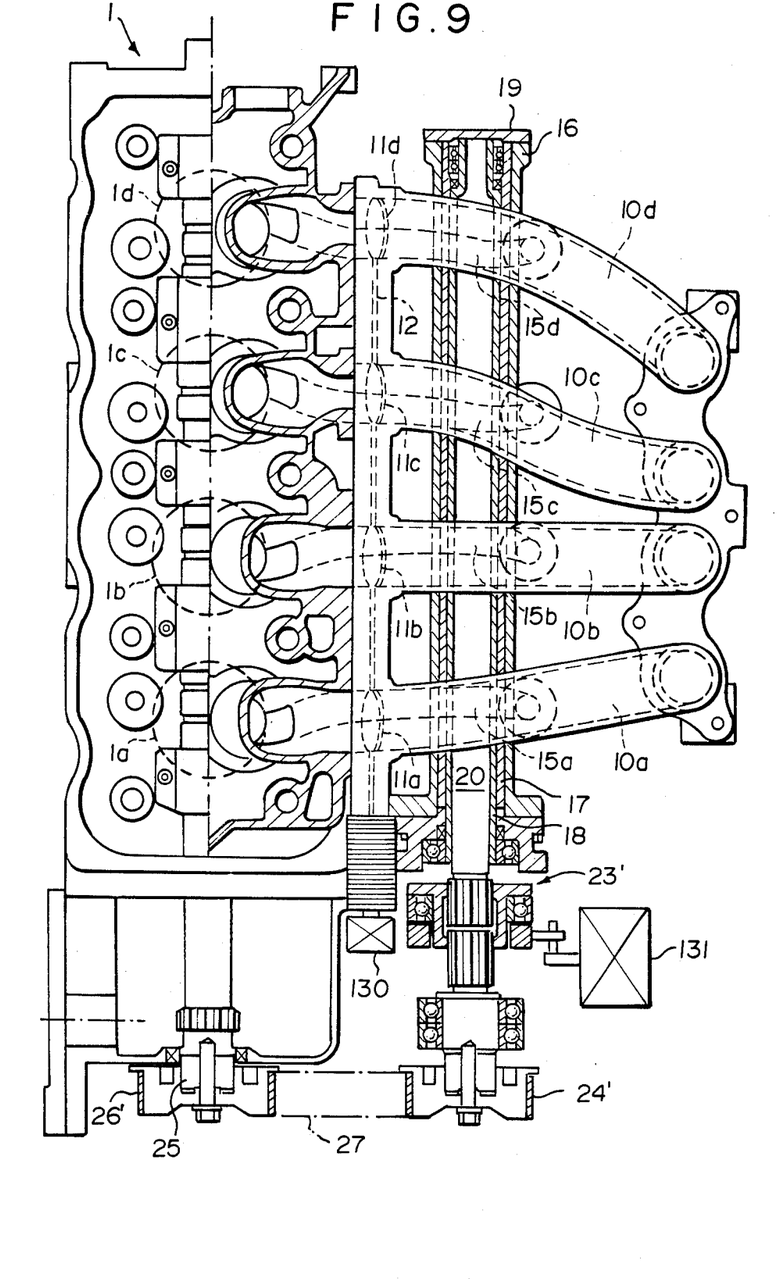

FIGS. 8 and 9 show another embodiment of the present invention. The engine 1 shown in FIGS. 8 and 9 is substantially the same as the engine 1 shown in FIGS. 1 and 2 in the mechanical structure, and accordingly, in FIGS. 8 and 9, the parts analogous to those shown in FIGS. 1 and 2 are given the same reference numerals and will not be described in detail here. In this embodiment, the shutter valves 11a to 11d are opened in the light load range when the vehicle is to be accelerated so that intake air is introduced into the combustion chamber both through the bypass passage and the intake passage. That is, in the embodiment described above, since the time for closure of the rotary valve is delayed as the amount of depression of the accelerator pedal increases, the amount of intake air introduced through the bypass passage is apparently increased when the accelerator pedal is pushed down to accelerate the vehicle in the light road range. However, since the rotary valve momentarily interrupts flow of intake air because of its structure, the amount of intake air cannot be increased soon due to the resistance of the rotary valve and accordingly quick response to acceleration cannot be obtained. In this embodiment, response to acceleration is improved by opening the intake passage in the light road range when the vehicle is to be accelerated.

A pulley 24' is connected to the first cylinder side end of the rotary valve 18 by way of a helical gear mechanism 23' so that the mutual angular position between the rotary valve 18 and the pulley 24' is variable. The pulley 24' is drivingly connected with a pulley 26' provided on the camshaft 25 by way of a belt 27 to drive the rotary valve 18 in response to revolution of the camshaft 25, the pulleys 24' and 26' being equal to each other in diameter. The mutual angular position between the rotary valve 18 and the pulley 24' is changed by an actuator 131 which drives the helical gear mechanism 23' under the control of a controller 132. Further, the shutter valves 11a to 11d are driven by an actuator 130 under the control of the controller 132. The controller 132 may comprise a CPU, for example, and into the controller 132 are input detecting signals from a crank angle sensor 133, an airflow sensor 134 for detecting air flow immediately downstream of an air cleaner 114, a negative pressure sensor 135 for detecting intake vacuum in the bypass passage 15a downstream of the rotary valve 18, a water temperature sensor 136 for detecting the temperature of engine cooling water, and an accelerator position sensor 137 for detecting the amount of depression of the accelerator pedal.

Figure 10:
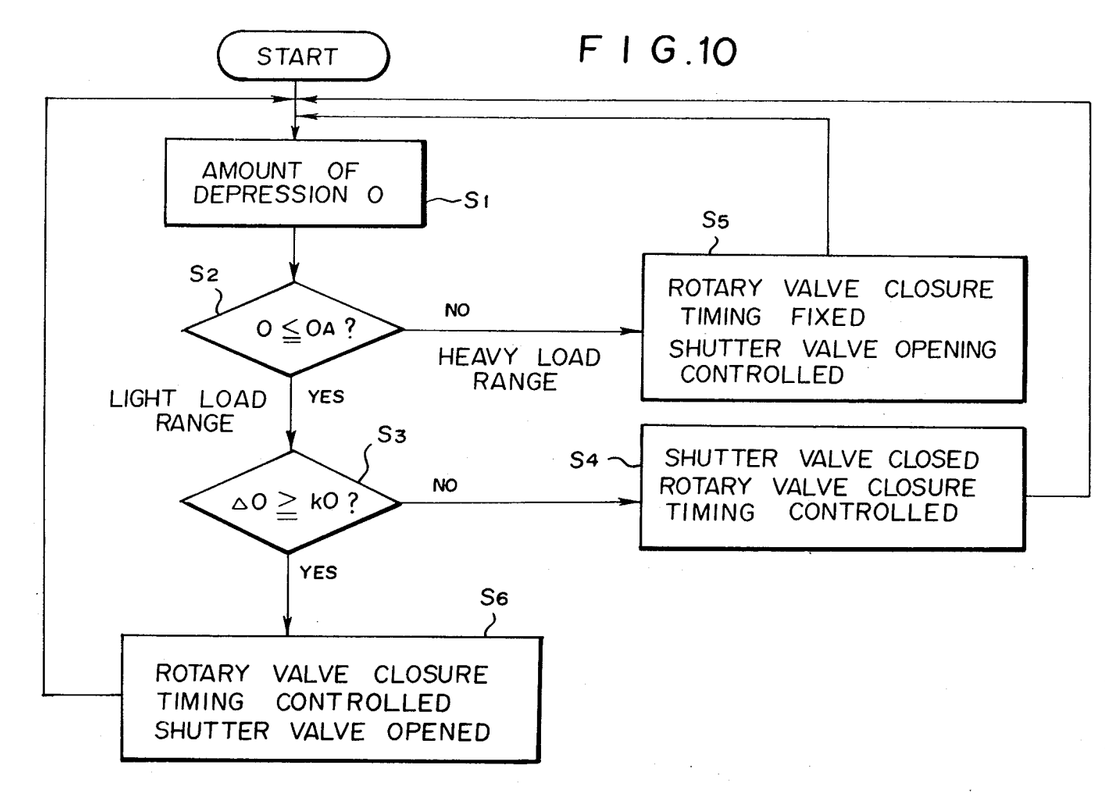
FIG. 10 is a view for illustrating the operation of the controller employed in the intake system shown in FIGS. 8 and 9.

The operation of the controller 132 will be described with reference to the flow chart shown in FIG. 10. In step S1, the amount of depression 0 of the accelerator pedal detected by the accelerator position sensor 137 is read, and in step S2, it is determined whether the actual amount of depression 0 is larger than the predetermined value $O_A$ separating the light load range and the heavy load range (see FIG. 3). When it is determined that the former is not larger than the latter, that is, when the engine operating condition in the light load range, it is determined in step S3 whether the rate of change $\Delta 0$ in the amount of depression 0 of the accelerator pedal [$\Delta 0 = (0_1-0_2)/(dt_1-dt_2)$] is not smaller than a preset value kO. When it is determined that the former is smaller than the latter, that is, when it is determined that the vehicle is not being accelerated, the actuator 130 is controlled to close the shutter valves 11a to 11d according to the characteristics shown by the solid line in the upper half of FIG. 3, and at the same time, the actuator 131 is controlled to delay the time the rotary valve 18 is closed as the amount of depression 0 of the accelerator pedal increases so that the relevant time substantially coincides with the end of each intake stroke when the amount of depression 0 becomes the predetermined value as shown by the solid line in the lower half of FIG. 3. Thereafter, the controller 132 returns to the step S1.

When it is determined that the actual amount of depression 0 is larger than the predetermined value $O_A$, that is, it is determined that the operating condition of the engine is in the heavy load range in the step S2, the actuator 131 is controlled to fix the relevant time to the time corresponding to the amount of depression of the accelerator pedal of the value $O_A$ (See the lower half of FIG. 3.), and the actuator 130 is controlled to increase the opening degree of the shutter valves 11a to 11d with increase in the amount of depression of the accelerator pedal (step S4). Thereafter, the controller 132 returns to the step S1.

On the other hand, when it is determined in the step S3 that the rate of change $\Delta 0$ in the amount of depression 0 of the accelerator pedal is not smaller than the preset value k0, that is, when it is determined that the vehicle is being accelerated in the low load range, the actuator 131 is controlled to control the relevant time according to the characteristics shown by the solid line in the lower half of FIG. 3, and at the same time the actuator 130 is controlled to open the shutter valves 11a to 11d before the amount of depression of the accelerator pedal reaches the predetermined value $O_A$ and to increase the opening degree of the shutter valves 11a to 11d with increase in the amount of depression of the accelerator pedal as shown by the dotted line in the upper half of FIG. 3. Thereafter, the controller 132 returns to the step S1.

In the case of an engine in which intake air is introduced into the combustion chambers solely through the bypass passages in the light load range, the intake vacuum is very weak and finely fluctuates in the light load range due to operation of the rotary valve and accordingly, it is very difficult to detect the intake vacuum precisely in the light load range. Therefore, in the case of an engine in which the ignition timing, air-fuel ratio, the amount of exhaust gas to be returned to the combustion chambers and or the like are controlled according to the engine load, if the engine load is detected on the basis of the intake vacuum and the engine speed, the control accuracy will be deteriorated.

As can be understood from the description above, in the intake system of the present invention, intake vacuum in the light load range is proportional to the opening time of the rotary valve 18 for which the rotary valve 18 is kept opened. Accordingly, the engine load can be detected with high accuracy from the opening time of the rotary valve and the engine speed irrespective of intake vacuum.

Figure 11:
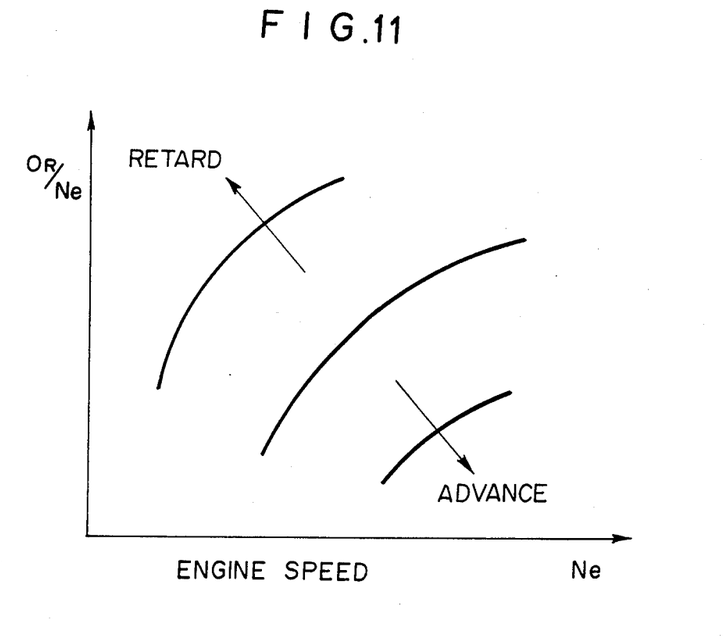
FIG. 11 is a view showing a map in which the fuel injection timing is related to the engine speed and the quotient of the opening time $O_R$ of the rotary valve divided by the engine speed Ne ($O_R$/Ne).

For example, by storing a map in which the ignition timing is related to the engine speed and the quotient of the opening time $O_R$ of the rotary valve divided by the engine speed Ne ($O_R$/Ne) as shown in FIG. 11, the ignition timing can be accurately controlled without being adversely affected by fluctuation in intake vacuum in the light load range.

We claim:

1. An intake system for an internal combustion engine comprising a first valve means provided to open and close an intake passage leading to each combustion chamber, a bypass passage for introducing intake air into each combustion chamber bypassing the first valve means, and a second valve means provided to open and close the bypass passage, the first valve means being operated to close the intake passage in a light load range and to open the same in a heavy load range, and the second valve means being operated to close the bypass passage in the middle of each intake stroke, wherein the improvement comprises a first valve control means which controls the first valve means so that the opening of the intake passage is increased as the engine load increases after exceeding a predetermined value, and a second valve control means which controls the second valve means to delay the time the bypass passage is closed with increase in the engine load so that the time the bypass passage is opened substantially overlaps with the time the intake valve is opened when the engine load reaches the predetermined value.

2. An intake system as defined in claim 1 further comprising an acceleration detecting means for detecting acceleration in the light load range and a correction means which controls the first valve control means to open the first valve means earlier.

3. An intake system as defined in claim 2 in which said correction means controls the first valve control means to open the first valve means at an engine load lighter than said predetermined value.

4. An intake system as defined in claim 2 in which acceleration is detected through the rate of change in the amount of depression of the accelerator pedal, and when the rate of change is larger than a predetermined value, the amount of depression is considered to be larger than the actual value.

5. An intake system as defined in claim 1 in which a fuel injection valve is provided in the intake passage downstream of the shutter valve and an air-assist system is provided with respect to the fuel injection valve to be operated when the intake passage is closed by the first valve means.

6. An intake system as defined in claim 5 in which said air-assist system comprises an air passage opening to the atmosphere at one end and communicated with a portion near the fuel injection valve at the other end by way of a number of orifices formed in a cap mounted on the injecting tip of the fuel injection valve.

7. An intake system as defined in claim 1 in which said first valve means comprises a rotary valve.

8. An intake system as defined in claim 1 in which the engine load is detected through the amount of depression of the accelerator pedal.

9. An intake system as defined in claim 8 further comprising a control means which carries out control on the basis of engine load and which detects the engine load by way of the opening period of said second valve means and the engine speed.

10. An intake system as defined in claim 9 in which said control means adopts the quotient of the opening period of the second valve means divided by the engine speed as the engine load.

11. An intake system as defined in claim 1 in which said bypass passage is smaller than the intake passage in cross section.

12. An intake system as defined in claim 11 in which said bypass passage is arranged to generate swirl of intake air in the combustion chamber.

13. An intake system as defined in claim 1 in which said second valve control means comprises a larger diameter pulley connected to an end of a rotary valve by way of a planetary gear mechanism, a smaller diameter pulley provided on a camshaft and drivingly connected with the larger diameter pulley by way of a belt to drive the rotary valve in response to revolution of the camshaft, the planetary gear mechanism comprising a ring gear coaxially connected to the larger diameter pulley, planet pinions which are mutually connected by a carrier and are in mesh with the ring gear and a sun gear in mesh with the planet pinions, the carrier being connected to the accelerator pedal by a wire member so that as the amount of depression of the accelerator pedal is increased, the relative position between the ring gear and the sun gear is changed.

14. An intake system as defined in claim 13 in which one of the planet pinions is operatively connected to an end of a valve shaft of the shutter valve means by a first link and a second link having an engaging pin inserted into an elongated slot formed in the first link to extend in the longitudinal direction thereof, the length of the slot being selected so that the engaging pin travels from one end of the slot to the other end of the same while the accelerator pedal is pushed down from the released position to the position corresponding to the predetermined value.

* * * * *